Aug. 23, 1966    J. H. LEMELSON    3,267,843
DOCUMENT PRODUCING MEANS
Filed July 25, 1963    4 Sheets-Sheet 1

INVENTOR.
JEROME H. LEMELSON
BY

Aug. 23, 1966  J. H. LEMELSON  3,267,843
DOCUMENT PRODUCING MEANS
Filed July 25, 1963  4 Sheets-Sheet 2

INVENTOR.
JEROME H. LEMELSON
BY

Aug. 23, 1966   J. H. LEMELSON   3,267,843
DOCUMENT PRODUCING MEANS
Filed July 25, 1963   4 Sheets-Sheet 3

INVENTOR.
JEROME H. LEMELSON
BY

Aug. 23, 1966         J. H. LEMELSON         3,267,843
                    DOCUMENT PRODUCING MEANS
Filed July 25, 1963                        4 Sheets-Sheet 4

INVENTOR.
JEROME H. LEMELSON
BY

United States Patent Office 3,267,843
Patented August 23, 1966

3,267,843
DOCUMENT PRODUCING MEANS
Jerome H. Lemelson, 8B Garfield Apts., Metuchen, N.J.
Filed July 25, 1963, Ser. No. 297,719
12 Claims. (Cl. 101—59)

This application is a continuation-in-part of my copending application Ser. No. 449,874, entitled Automatic Production Systems and filed on July 28, 1954.

The instant invention relates to apparatus for preparing a document for recording a transaction and more particularly to a recording and transducing apparatus adapted to simultaneously produce a second document recording the same transaction, one of said documents being employed as a receipt for the purchaser and the second being immediately available for accounting and/or billing purposes.

In most commercial transactions it is highly desirable to provide a written receipt or document recording the specific transaction. Of the total information provided on such a receipt, some of the information contained therein may be considered to be fixed or repetitive while the remaining information will vary from transaction to transaction. For example, in recording a purchase or sale, a name, address and other information recorded by the purchaser may be considered to be fixed information. Other information regarding the article purchased, catalog number, price, and the like may be considered to be changeable. A large majority of transactions are usually comprised of both fixed and variable information which information or data is impressed directly on a recording surface such as paper or magnetic tape, cards or other suitable forms which may be automatically fed through a suitable reading mechanism for automatic high speed accuracy into a billing computer or other suitable accounting facilities. The instant invention is primarily concerned with the transducing of such information, and apparatus as well as pre-recorded and/or previously prepared devices so as to both simplify and speed up the entry of such information upon a recorded surface.

The instant invention is comprised of suitable housing means including means for moving a continuous recording surface and further having means for receiving the subscriber's card indicating the subscriber's name and/or identifying number, said cards being better known as "credit cards." The proper insertion of the credit card enables the selection of a combination of suitable keys for entering information such as, for example, item identifying number, cost, etc. When suitably set so as to be in readiness for punching of both fixed and variable information, movable platen means are energized for the purpose of imprinting both fixed and variable information upon a document comprising the continuous recording surface. A second or "carbon copy" is simultaneously made with the first copy and said second copy is automatically retained within the confines of the housing means whereas a first copy is made available for removal by the subscriber operating the record producing facility by utilizing the well known "credit card" in the preparation of the document recording in a business transaction. This greatly simplifies both the preparation and the time required for preparing the document and thus thereby enables the record producing apparatus to prepare records of more transactions per unit time than such prior art devices and its very simplicity and ease of operation enhances the use thereof by such subscribers.

It is accordingly a primary object of the instant invention to provide a new and improved apparatus applicable for the entry of fixed and variable information upon a recording surface which information is easily automatically transduced both upon and from a recording member for computing and record keeping functions.

Another object of the instant invention is to provide an improved system for record keeping which system is adapted to removably receive pre-recorded cards of the credit card type which system includes means for information entry adapted to receive one or more of said cards and to record and scan information therefrom and to further record variable information derived by manually programming or setting variable input means in a predetermined combination.

Another object of the instant invention is to provide a simple device for receiving a card containing pre-recorded information and for transferring said pre-recorded information upon a recording surface while simultaneously recording additional information which is enterable into said device by manually setting selective input information means.

Still another object of the instant invention is to provide a system for recording transactions which utilizes pre-recorded cards such as the so-called credit cards and includes the means for recording information from a card in a fixed position relative to further information derived by manually setting input means provided within the device without the need for making hand written entries.

Another object of the instant invention is to provide simple electromechanical means for recording business transactions which device is capable of preparing the recording of said transaction contained within said device while, at the same time, dispensing a receipt for use by the subscriber.

These and other objects of the instant invention will become apparent when reading the accompanying description and drawings in which.

Figure 3:
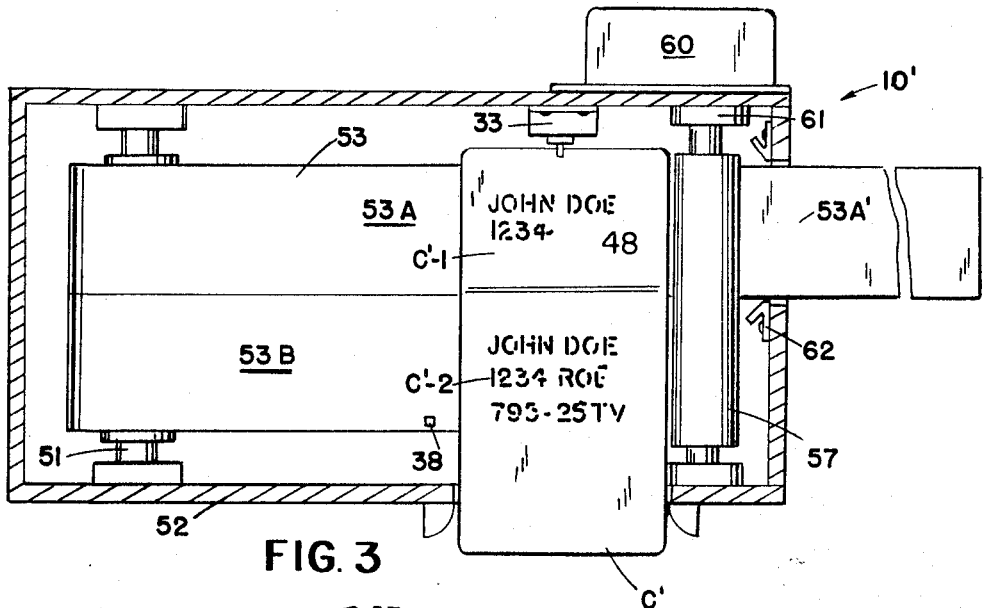
FIGS. 3 and 4 are top and side views of an alternative embodiment to that shown in FIGS. 1 and 2 with the cover and side plate removed, respectively.
Figure 4:
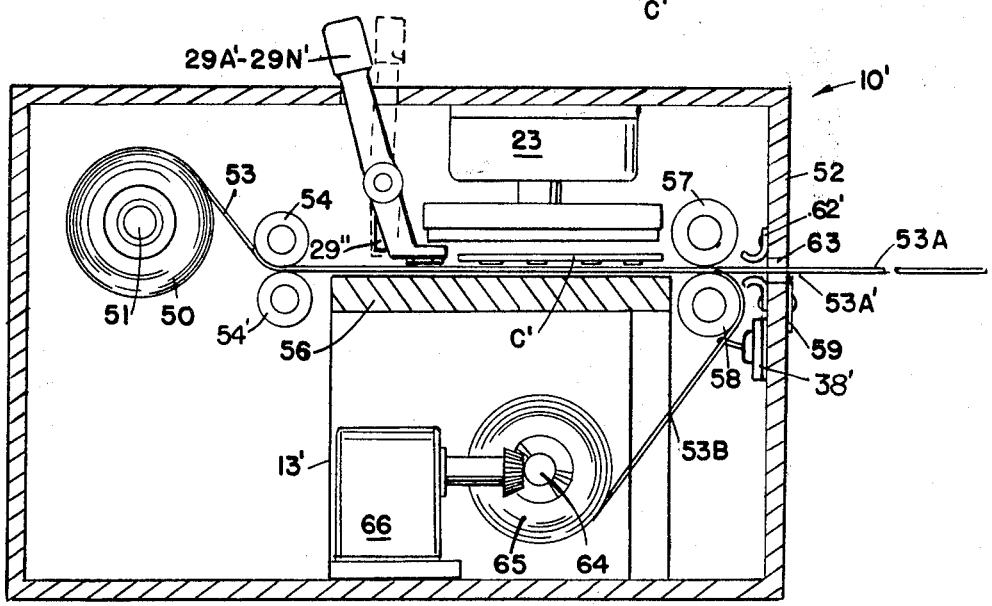
Figure 4:
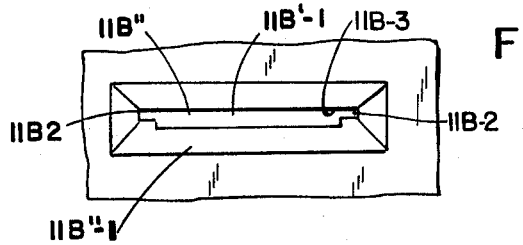

FIG. 4' is a detailed view of the credit card receiving means for the recording mechanism of FIGS. 3 and 4.

Figure 5:
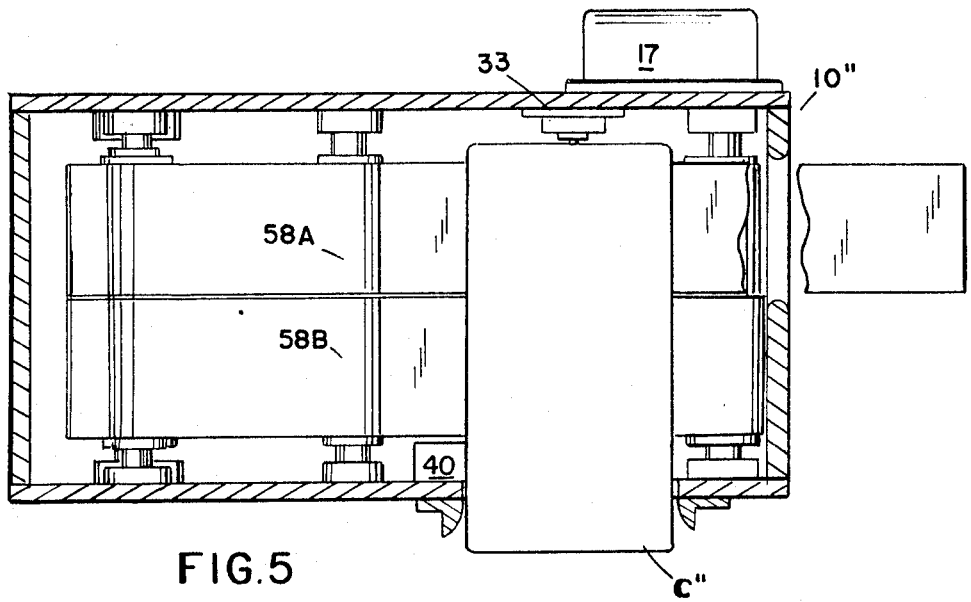
Figure 6:
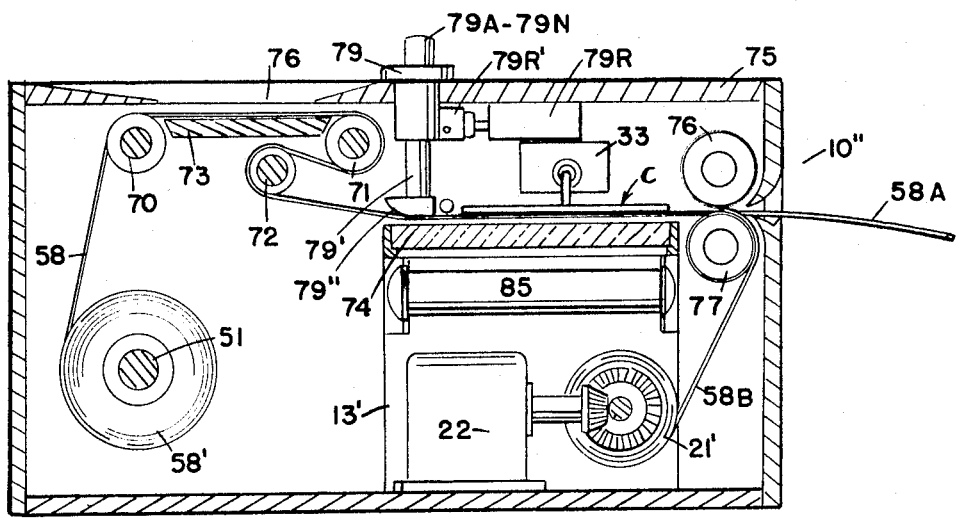

FIGS. 5 and 6 are top and side plan views of still another embodiment of the device of FIGS. 1 through 4 with the cover and side plate removed, respectively.

Figure 7:
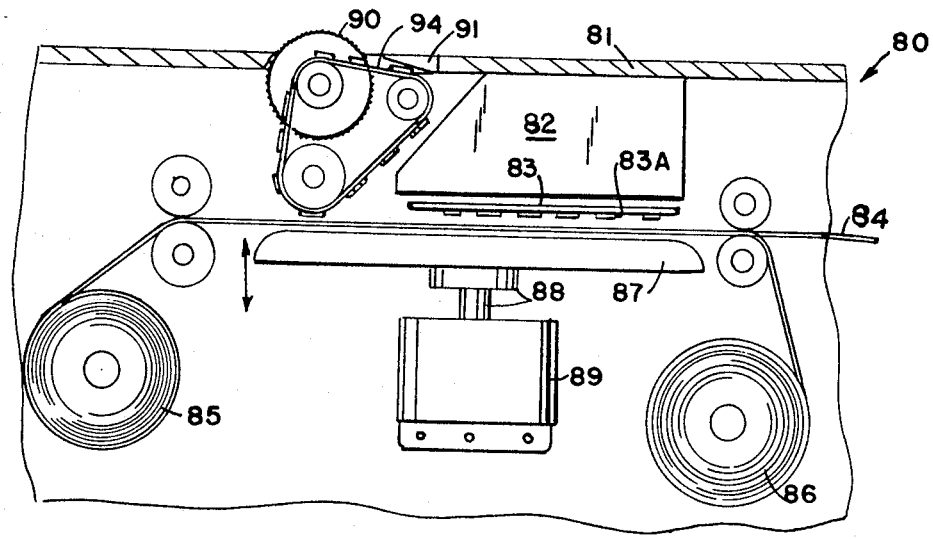
Figure 7A:
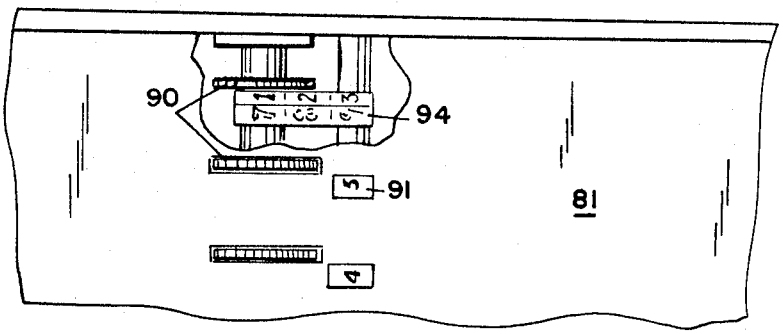

FIGURES 7A and 7 are side and top views respectively of another preferred embodiment of the instant invention with portions of the housing removed to display the contents.

Figure 8:
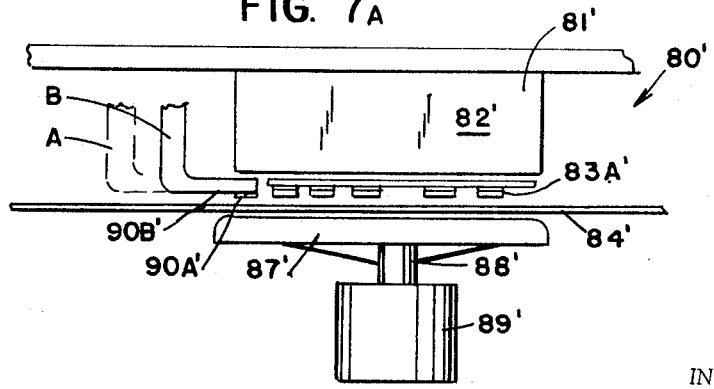

FIGURE 8 shows a detailed portion of still another embodiment of the instant invention.

In general, the instant invention relates to an accounting apparatus or device which is applicable to various business transactions without the need for personal attendance or the supervision of a clerk provided by a vendor or the attendance of the vendor himself. More specifically, the invention is preferably, although not necessarily, exclusively applicable to transactions which do not involve the transfer of material goods. Transactions for the purchase of insurance such as, for example, travel insurance or the like, may be easily and quickly accomplished by means of devices such as are provided herein, which devices also permit the rapid and automatic recording of information in a form where it may be easily entered into a computer or other accounting system for the accomplishment of automatic billing without the need for human attendance.

The conventional method of preparing short term insurance policies such as travel insurance by means of a machine generally requires that the purchaser enters most if not all information by means of a writing implement. This operation is extremely time-consuming and tedious. As a result, many potential transactions are not consummated due to the natural reluctance of potential customers to manually prepare such written documents.

In accordance with the teachings of the instant invention, subscribers to the system are provided with a card upon which is prepared specific information identifying the subscriber by name and/or serial identifying number which card is adaptable for use in the recording instrument which is further provided with programmable means by which the subscriber may enter the variable information for inclusion upon the recording surface. In certain instances, some of the variable information may be self-programmed for entry thereof. Such information being date, time, amounts etc. Fixed information regarding the subscriber is derived from the subscriber's card by means of prepositioning a card in the machine prior to activating the machine in order to effect the transaction. The other necessary information being variable in nature, is derived in a preferred embodiment of the instant invention when the subscriber programs the machine by means of depressing suitable keys or bi-stable push buttons for entry thereof upon the recorded surface. Deactivating or disabling means are also provided so that if complete information is not programmed or otherwise enterable, no entry of the transaction will be made.

Figure 1:
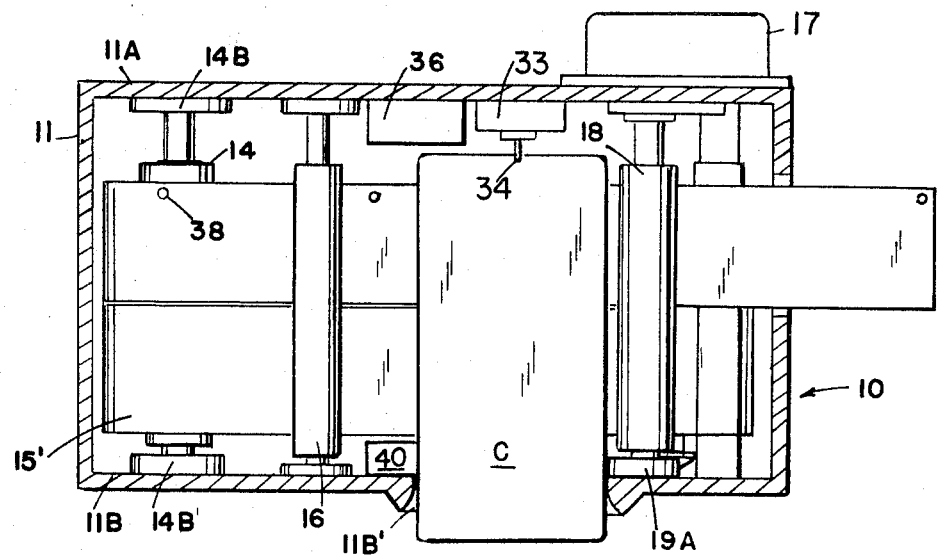
FIG. 1 is a top view of a recording mechanism designed in accordance with the principles of the instant invention and showing the cover removed to display its contents.
Figure 2:
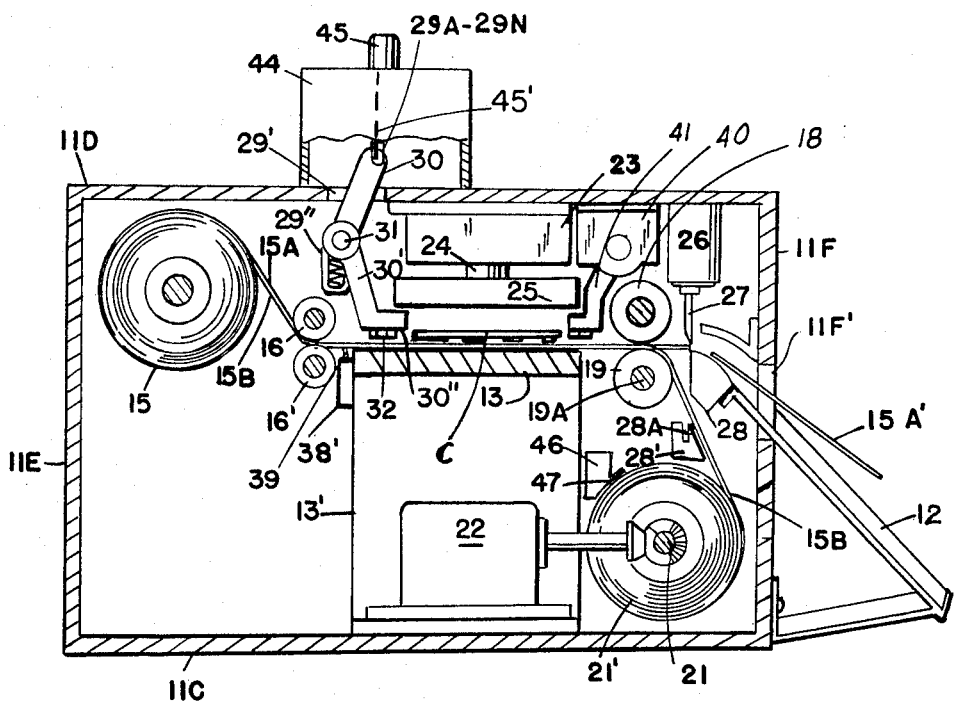
FIG. 2 is a side view of the recording mechanism of FIG. 1 showing the recording mechanism with one side plate thereof having been removed.

FIGS. 1 and 2 illustrate one embodiment of a record making and receipt dispensing device 10 for preparing documents to record transactions such as insurance, orders and the like. The apparatus 10 comprises a rectangular housing 11 having sidewalls 11A, 11B, a bottom wall 11C, top wall 11D, and end walls 11E and 11F. The sidewalls support a plurality of elements of the recording device including the bearings 14B and 14B' in which is journalled a shaft or drum 14 adapted to rotate therein and further to support a roll 15 of recording material 15' such as a paper tape means which consist of at least two sheets 15A and 15B with the top sheet 15A having suitable copying material such as duplication carbon or alternatively with said sheets of materials being designed such that an impression from the raised letters of the credit card when applied with sufficient force on the top sheet 15A may be visually or otherwise indicated or impressed upon the bottom sheet 15B. Certain ink or printing material filled papers such as are used for receipt copies of the American Express Credit System may also be provided for both sheets 15A and 15B.

The multiple layer sheet 15' is guided between free wheeling rollers or bars 16–16' and then over a backing plate 13 which is supported above bottom 11C of the housing. The double or multiple layer sheet 15' passes beyond the backing platen 13 and is sandwiched between driving rollers 18 and 19 which are supported on suitable shafts 18A and 19A for pivotal movement in the side walls 11A and 11B of the housing. Roller 18 frictionally engages the top of multiple layer sheet 15' and is power operated by a motor means 17 to rotate shaft 19A and thence roller 19 which, in cooperation with the pressure roller 18 engaging the bottom face of multiple layer sheet means 15'.

Individual sheets 15A and 15B separate beyond rollers 18 and 19 with the upper sheet 15A passing above a second backing plate or bar 28 which cooperates with a servo operated shear blade 27 to sever a predetermined portion 15A' of sheet 15A from the remainder of multiple layer sheet 15' such that the severed portion 15A' passes through a suitable opening 11F' in end wall 11F enabling the severed sheet to fall onto a chute or receiving bin 12 thereby making available the severed portion for use as a receipt by the subscriber utilizing the recording mechanism.

The sheet 15B is guided beneath backing member 28 and is wound upon a powered take-up roller 21 powered by motor means 22 so as to gather the continuous sheet 15B into a roll 21' of stored paper which is retained within the housing for use in subsequent billing or other accounting operations.

In the operation of the device 10 shown in FIGS. 1 and 2 a card such as a so-called credit card C is inserted into an opening 11B' provided in side wall 11B, said card is also guided by guide portions 11B" (see FIGURE 4') of the wall 11B and within housing 11 as it is manually inserted so that it is positioned just above the composite sheet 15' and is placed in alignment with a pressing plate or bar 25 which is secured to the lower end of a shaft 24 connecting the plate 25 to a lineal servo driving means 23 as for example, a solenoid. A limit switch 33 is secured within the housing in a position whereby its actuator arm or projection 34 will be moved inwardly towards the switch 33 by the adjacent edge of credit card C so as to close the switch which thereby initiates an operating cycle which first energizes a multi-circuit self-resetting timer 36 connected to limit switch 33 which timer effects the following functions:

Solenoid 23 is first energized causing platen 25 to engage the upper surface of card C which has its raised or embossed face (not shown) facing in the downward vertical direction. The embossed face of the card is pressed by the platen ram 25 against the multiple sheet means 15' with sufficient force to cause an imprint or visible impression to be made on both sheets 15A and 15B simultaneously. After solenoid 23 retracts (i.e. it is deenergized) drive motors 17 and 22 are energized by multi-circuit timer 36 for a sufficient time period so that motor 17 moves sheet 15A through a distance of one form length such that the trailing edge of the completed form or receipt is immediately in position beneath the shear blade 27 while the leading edge of the next transaction form is immediately adjacent shear blade 27. Upon de-energization of motor means 17, solenoid 26 is then operated by cycle timer 36 causing shear blade 27 to sever portion 15A' of document 15A, the front end of the severed portion having already passed partially through opening 11F' such that upon completion of the severing action the transaction form 15A' falls by gravity into the dispensing bin 12. Shear means 27 may be replaced by simply substituting a frictional surface for momentarily holding sheet 15A at the point of shear blade 27 adjacent to a perforated line along the receipt so that the receipt portion 15A' may be simply torn off along the perforated edge by the subscriber using the machine. As a second alternative, shear means 27 may be completely removed and substituted simply by providing perforations between the trailing edge of the completed receipt and the leading edge of the next receipt to be prepared by the recording mechanism.

Since it is usually required to enter variable information on both copies of the transaction documents such as, for example, the amount of insurance, the product order code, etc., a means for selectively effecting such an entry is provided in the form of a plurality of push button assemblies 29A through 29N each of which is connected to a linkage mechanism (not shown) for positioning, when the respective push button is depressed, a numeral or letter die or cut such as the die 32 in the path of the movable platen 25 so that an imprint of said variable information is made adjacent the imprint provided by the card C upon the sheets 15A and 15B. Each push button assembly 29A through 29N, is guided by an elongated sliding-bearing or slot means 29' provided in top wall 11D and has its associated angular arm 30 pivotally supported by walls 11A and 11B. Each button projects downward and vertically upward from the top wall of the housing 44. Each push button assembly is a bi-stable device pivotable either in the clockwise or counterclockwise direction about its pivot pin 31 which pin is journalled in the elongated slots 29" provided in side walls 11A and 11B (only one of said slots being shown in FIGURE 2). Each push button, when depressed, pivots the angular arm 30 counterclockwise about pivot 31 (through a linkage) so as to swing the lower portion 30′ thereof, which contains the printing cut 32, so that its lower extremity 30″ moves from a retracted position toward a position which is in close proximity with the left hand end of platen ram 25. The pivot pin is biased by bias means or spring means 29″ so that it is urged vertically upward; however, when solenoid 23 is energized, plate 25 moves in the downward vertical direction catching and urging the surface 30″ downward against the force of the biasing spring 29″ so that the cut 32 is impressed upon the surface of multi-layers 15A and 15B together with the impression of the embossing upon credit card C. The elongated slots 29″ are sufficient to permit arms 30′ to move to a sufficient distance in order to provide a suitable impression upon the multilayer sheet means 15′. The extreme lower portion 30″ on which cut 32 is secured may also be spring mounted relative to arm 30 or may be free floating to permit cut 32 to move vertically and to be impressed against the upper surface of sheet means 15′ in alignment with the backing plate 25. The point at which the cut or die 32 engages the upper surface of sheet means 15′ is to one side of the area which receives the impression from card C. It should be noted that arms 30 which are not rotated in the counterclockwise direction from the position shown in FIG. 1 while they may be moved in the downward vertical direction due to the movement of pin 31, will not be impressed against the document 15′ since they will not be caught by the lower left hand edge of the movable platen 25. Thus by selectively retracting and advancing the push buttons 29A to 29N certain of the dies come into alignment with the movable platen 25 to provide a code or alphanumeric imprint indicative of selected notation, which imprint may be provided adjacent the imprint of both sheets made by the master or embossed portions of the card C when compressed by the plate against the composite sheet means 15′. To facilitate selection of the information to be entered by means of operating the push buttons, the visually observable symbol or imprint may be provided upon the surface of or adjacent each push button and instructions may also be provided on the upper surface of the top lid of the housing 11 to further describe the operation of the recording mechanism. One embodiment of the push button arrangement may be comprised of the projecting housing portion 44 having a plurality of push buttons such as for example, a push button 45, the number of push buttons being equal in number to the number of levers 29A through 29N. The push buttons are then mechanically linked as shown by the dashed line 45′ showing such linkage in schematic fashion to select certain combinations of levers 30 for actuation to the counterclockwise position or to enter the desired variable information. The selection of the different push buttons would of necessity cause the actuation of a different combination of certain levers 30.

Since the degree of operation of the motor 22 to rotate the take up roll 21 will decrease as the take up roll of paper 21′ increases in diameter as more paper is fed thereto, motor means 22 is preferably adapted with a suitable electronic control 46 having an arm 47 which bears upon the surface of roll 21′. As the radius of 21′ increases, arm 47 rotates in the counterclockwise direction causing the device 48 to alter the period in which motor means 22 is energized so as to actuate or rotate the take up roll 21′. As a secondary arrangement the control means 46 may cause stoppage of motor means 20 as tension increases on the web of paper wound on shaft 21.

Motor control means 47 may be eliminated by providing a suitable control means for motor 22 which stops the motor when the trailing edge of the transaction form is positioned beneath the blade member 27. Such control may be effected by providing holes or apertures 38 in the multi layer web 15′ such as is shown in FIG. 3 of the drawings. The apertures are placed at spaced intervals which define the leading edges of said forms and are arranged to override limit switch 38′ as shown in FIG. 1 with its actuator arm 39 adapted to bear against work means and to become actuated so as to move through the aperture 38 and to control certain movements being employed to operate the solenoid 27 thus effecting cut-off the desired section 15A′ of the sheet 15A, and further to provide deenergization of the motor 22 to control the take-up of the paper roll 21′.

In still another form of the invention the take-up or storage reel 21′ may be completely eliminated by severing also portions of the sheet 15B and storing them in a stack within the housing wall with severed portions of 15A or dispensed upon the outside bin or tray 12. One means of severing a portion of the sheet 15B is by providing member 28′ having a suitable slot 28A for receipt in a portion of said slot of the tripper shears 27 by an amount sufficient so as to sever sheet 15A as well as sheet 15B. A suitable bin (not shown) is further provided for the purpose of collecting all receipts to be retained internally within the recording mechanism.

Depending upon the application to which the printing device 10 is used, certain problems involved in its use may arise such as times when the user or operator may attempt to insert the credit card C into the slot 11B′ in the wall with the raised or embossed surface of the card facing in the upward vertical direction as opposed to the correct position which is with the embossed portion facing in the downward vertical direction. Since movement of the reciprocating platen 25 against the raised letters of the card may buckle or otherwise damage said letters and further since it will not result in the creation of a suitable impression upon the sheets 15A and 15B, an arrangement such as that shown in FIG. 4′ is provided to prevent the operation of the solenoid 23 if the card C is inserted with the raised code or letters facing upward. The arrangement of FIG. 4′ is such that the slot 11B″ is shaped so that it will only permit passage of the card C therethrough when the raised or letter portions of the cards are facing downward. The length of the slot 11B″ is provided with a central portion 11B–1 at the bottom marginal edge of the slot which portion has a thickness, together with the upper portion, which is sufficient to permit the embossed letters of the card to pass therethrough when the card C is facing downward. The remaining end portions 11B–2 of the slot are a few thousands of an inch greater in width than the thickness of the card C in the portion where the card is not raised or embossed. The length of the slot is approximately 1/16 of an inch greater than the width of the card. The card is intended to be inserted with the raised portion facing upward so that the raised portion or letters will engage the upper edge 11B–3 of the slot to prevent passage of the card. The notation 11B″–1 refers to a bevel or sloping guard for the card which protrudes from the slot and provides means for facilitating insertion of the card C. The raised portion or letters essentially provided on the card C are positioned so that it will make little difference as to which longitudinal edge of the card is inserted into the slot first. However, by printing a suitable arrow as shown at 48 in FIG. 3 on the card C, a visual indication is provided of which longitudinal edge of the card is to be inserted into the slot and will further facilitate automatic reading of the characters imprinted on the sheets 15A and 15B.

As an alternative embodiment to that shown in FIGS. 1 and 2 of the drawings, FIGS. 3 and 4 show a recording mechanism 10′ provided with a supply roll 50 mounted upon a suitable shaft 51 which is suitably journalled in the sidewalls of the housing 52. The paper tape or document 53 pass between the rollers 54 in the same manner as previously described and upon the backup plate 56 and subsequent thereto between rollers 57, 58 which operate in a manner similar to the rollers 18 and 19 previously described with respect to FIGURES 1 and 2. Basic differences in the embodiment of FIGURES 3 and 4 is that the roll 50 of paper 53 is comprised of two separate sheets 53A and 53B both of which are fed simultaneously and both of which pass above the back up platen 56. The credit card C' employed in the embodiment of FIGURES 3 and 4 is provided with two embossed areas C'-1 and C'-2 being the exact duplicate of the other for the purpose of impressing this information upon both sheet 53A and 53B. Both tapes 53A and 56B are driven by drive roll 51 which is connected by shaft means 61 to a drive servo 60. The first paper tape 53A is arranged so that it passes through an opening 63 in the side wall of housing 52 so as to provide a receipt form such as a receipt form 53A" which may be torn off along its trailing edge 53A' by the subscriber in order to be retained by the subscriber for his own purposes. The second paper strip 53B passes between drive roll 57 and over roller 58 and is wound up by the spool 64 actuated by a take up roll servo 66 to form the accumulating paper roll 65 thereon.

The operation of the embodiment of FIGS. 3 and 4 is basically the same as that of FIGS. 1 and 2 wherein the limit switch 33 initiates the cycle operation of the solenoid and drive mechanism within the housing upon suitable insertion of card C'. One basic difference however is that each of the lever arms 29A–29N' is provided with two dies or cuts at its lower end for the purpose of making a suitable imprint upon both the dispensed paper strip 58A as well as the stored paper strip or tap 53B.

Embodiment 10" of FIGS. 5 and 6 is substantially similar to that shown in FIGS. 3 and 4 except that the supply roll 58' of dispensed paper strips 58A and 58B passes over a first roller 70, second roller 71 and a third roller 72, which arrangement is provided so that paper 58 may pass above a stationary platen 73 which is positioned immediately beneath the top surface of the housing 75 which is provided with a suitable opening 76 so as to permit the user of the machine to make written notations upon the surfaces of the strips 58A and 58B. The strips 58A and 58B then pass over a backing platen 74 which in this embodiment is a glass, plastic, rubber or other suitable transparent plate. An ultraviolet light source 85 is positioned immediately adjacent and beneath plate 74. Keys 79A to 79N are operative when selectively depressed, to advance respective shafts 79' of each key mechanism downward. Secured to the end of each shaft 79' is a small plug 79" the bottom face of which contains indicia such as alpha-numeric (i.e., alphabetic or numeric) characters on a white background. When said bottom face of member 79" is urged into abutment with the upper face of ultraviolet sensitive sheeting 58, ultraviolet light from source 85 is operative to expose 58 with the alpha-numeric character on 79" developable as an image therein. Each key mechanism 79 is bi-stable in operation, that is, the keys remain depressed with the plugs 79" depressed against the upper face of the recording paper 58 unless each key is again pushed by hand which releases shaft 79' to move upward. Notation 79R refers to a solenoid or servo operated device the output shaft of which is coupled to a reset mechanism 79R' connected to all key mechanisms 79 for automatically resetting all keys in response to the operation of the cycle timer 36 (not shown).

The ultraviolet light source 85 is energized in order to expose a length of each of the sensitized paper strips 58A and 58B for the desired recording images. The sensitized paper may be of any suitable lightsensitive, heat developable type such as reproduction paper sold under the trade-mark name Thermo-Fax manufactured by the Minnesota Manufacturing Co. of St. Paul, Minn. The sensitized paper which has been appropriately exposed, then passes between drive rollers 76 and 77 to be dispensed in a manner similar to that described in FIGS. 3 and 4. Roller 77 however, is provided with a suitable heating means such as electrical resistance heater wires or the like, embedded therein which are operative so that when said rollers are being rotated heat developable images are generated in the two strips 58A' and 58B'. The Thermo Fax recording arrangement may further be substituted by suitable electrostatic operative or photographic means to photograph the information presented on the credit card C" as well as the variable information provided at the ends of the selected and depressed keys of the key bank 79 arranged as a row or rows across the top wall 75A of housing 75.

As previously described, in order to provide additional variable information such as the date and time of the transaction, suitable clock means such as, for example, the clock 40 shown in FIG. 1, is provided in the recording mechanism having reciprocating key members 41, only one of which is shown in FIG. 1, which keys are continuously changing in their positions relative to movable platen 25 as the time and date continually changes in order to provide a suitable indication of date and time of transaction when such information is desirable to complete the transaction. Rotating clock driven printing wheels may also be used to effect a numerical printed indication of time, date, etc. and the frame of rotationally supporting such wheels may be engaged by the platen 25 to cause the lowermost portions of the wheels to be impressed against the paper strip, photographed or otherwise reproduced.

FIGS. 7 and 7A show another dispensing means 80 whose top-surface 81 has a backing plate 82 positioned therebeneath. The card 83 when properly positioned lies immediately beneath backing plate 82 with the raised lettering 83A projecting vertically downward. The record paper 84 is dispensed from spool 85 and extends to takeup spool 86 which receives the carbon copy while the original copy 84A is dispensed to the exterior of the machine in the same manner as previously described.

A platen ram 87 is positioned beneath record paper 84 and is attached to armature 88 actuated by solenoid 89. The top surface 81 is provided with a plurality of rotatable code wheels for setting up the variable data positioned at 93. A plurality of windows 91 are associated with the code wheels 90 beneath which are positioned movable tapes 94 actuated by the rotatable code wheels 90. Tapes 94 are provided with lettering to indicate the type faces which are positioned adjacent record medium 84. When solenoid 89 is actuated both the type faces 93 and the raised portion 83A of card 83 are simultaneously printed upon record medium 84.

FIG. 8 shows still another dispensing means 80' which employs a plurality of Z-shaped keys 90' pivotally supported within housing 81' and movable from position A to position B so that the lower edges 90A' of keys 90' are positioned above record medium 84'. Edge 90B' of key 90' rests against the lower edge of backing plate 82' so that when platen ram 87' moves vertically upward both the type on the lower surface 90A' and the raised lettering on card 83A' are recorded upon record medium 84'.

In the embodiments illustrated in FIGS. 1–8, the slotted hole 11B' for receiving the card C is shown disposed horizontally in the side wall 11B of the housing. Other arrangements may include disposing the slotted hole in the top wall 11D so that the card will drop by gravity through part of the housing adjacent a section of the recording member or tape which is guided substantially vertical. A vertically extending slotted hole in the side wall may also be utilized and the guide means for the card which is exterior of the housing may comprise a sheet metal trough extending a substantially greater degree than 11B" beyond the side wall to receive and guide the card C through the housing.

Means, such as a photoelectric detector, may be utilized in place of the limit switch 33 to detect the card.

Certain possible variations in the illustrated apparatus are noted as follows:

In the embodiments of FIGS. 1–4 it has been noted that separate sheets of print impressing paper such as carbon paper may be employed between the inserted card and the record member, or carbon black may be coated on a face of one sheet abutting a second sheet, or printing material such as carbon may be incorporated or on the surface of the record member coated so as to provide a visible marking when impressed, a stationary or movable inking means may be disposed between the card and the record member in the housing. For example, carbon ribbon may be provided on a transport and movable within the housing to form an imprint on the record member when impressed with the card thereagainst and against the record member or members. The transport for the ribbon may be geared to the means driving the paper tape but operated to move a short distance with each movement of the record paper. Since the average carbon ribbon is usable for multiple impressions, suitable imprints from substantially the same portion of a ribbon may be obtained.

In the embodiment of FIGS. 5 and 6, it may be desirable, in certain instances, to provide servo driven means for urging the paper into abutment with the inserted card and the depressed keys 79. This may be accomplished by the ram means provided in FIGS. 1 to 4 operative to engage either the card or record paper and urge it against the other. For example, the transparent plate 74 per se or together with the light source 85 may be movably mounted and connected to a solenoid operative to engage the bottom face of the paper 58 against the face of the inserted card C upon activation of switch 33. In such an embodiment, a backing plate of the type described which is supported by the side walls of the housing would be provided above the card to restrain its upward movement in a manner similar to that shown in FIG. 7.

In still another embodiment, the inserted card may be driven through or into and out of the housing between rollers or on a closed-loop conveyor belt and is engaged within the housing by a ram of the type described against the record paper to provide an impression thereon. A further variation in the apparatus of FIGS. 5 and 6 may include means for receiving and driving the card through the rollers in the housing one of which rollers may contain the ultra-violet light source to effect exposure of the sensitive paper 58 to the card images after which the paper is heated, as described, to develop the images therein.

In a further embodiment of the apparatus described herein, it is noted that the embossed card which is inserted into the document reproducing device may be replaced by a card having a plurality of cut-outs therein representative of alpha-numeric characters or codes. The provision of a record of the transaction on the recording medium or paper tape may be effected by compressing an ink or carbon bearing medium such as a carbon ribbon, ink pad or the like against one face of the card such that a portion or portions of the printing medium pass through the openings therein and are brought to bear against the surface of the recording medium or paper tape immediately adjacent the other face of the card. This will provide a printed record on the recording medium having the shape of the cut-outs in the card and by provision of a plurality of sets of cut-outs in two portions of the card, two recording mediums may be imprinted as described, one to be kept within the machine housing and the other to be dispensed as a receipt or record of the transaction.

It is also noted that a card containing cut-outs or openings in the shape of symbols, characters, perforations or the like may be utilized in the embodiment illustrated in FIGS. 5 and 6 and inserted between the light source 85 and the light sensitive recording medium 58 whereby direct exposure of said recording medium to light after passing through the card may be utilized to provide a record of the transaction and the symbols provided on the particular card. The card itself, when inserted, may be biased against the surface of the recording mediums so that only light passing through the cut-outs and substantially the contour thereof will expose the surface of the light sensitive material.

FIGURES 7 and 7A show another dispensing means 80 whose top surface 81 has a backing plate 82 positioned therebeneath. The card 83 when properly positioned lies immediately beneath backing plate 82 with the raised lettering 83A projecting vertically downward. The record paper 84 is dispensed from spool 85 and extends to take-up spool 86 which received the carbon copy while the original copy 84A is dispensed to the exterior of the machine in the same manner as previously described.

A platen ram 87 is positioned beneath record paper 84 and is attached to armature 88 actuated by solenoid 89. The top surface 81 is provided with a plurality of rotatable code wheels for setting up the variable data positioned at 93.

It is seen from the description of the foregoing embodiments the instant apparatus provides a recording mechanism which simultaneously provides both a stored document and a dispensed document setting forth all details of a transaction. The operation of said mechanism being simple, straightforward and relatively fast in the performance thereof and which further is designed so as to be readily adapted for use in billing and for analysis by accounting computers.

While the foregoing description has set forth specific embodiments it provides for the purpose of carrying out the principles of the instant invention, various other embodiments and modifications will become obvious and it is desired that the scope of the instant invention should be limited if only to extent of the limitations of the claims set forth below.

I claim:

1. In a document producing means employing an oblong paper sheet workpiece and a card member having raised portions identifying said card, and including means for feeding said sheet through the document producing means, the improvement comprising a housing for said document producing means; an opening in said housing for removably receiving said card; means for positioning said sheet adjacent the card inserted into said opening; driving means, switch means controlled by the insertion of said card for energizing said driving means for movement into a path to urge the inserted card against said sheet to form an impression thereon; a plurality of manually settable means, each having a raised portion defining a discrete character and each being movably mounted between a first position out of the path of movement of said driving means and a second position in the path of movement of said driving means; said driving means comprising a single platen member for simultaneously urging said card and selected ones of said manually settable means into engagement with said sheet wherein the raised portions on said card and on said selected settable means create an impression on said sheet.

2. The recording apparatus of claim 1 wherein the opening in said housing for receiving said card has a configuration to receive said card which is aligned so that its raised portions project in the direction of said tape means and further to prevent the reverse alignment of the card in said housing.

3. In an information processing apparatus for use in combination with a record card with a portion of said card being raised to form characters identifying said card, and an elongated sheet of record-keeping paper, the improvement comprising a housing, an opening in said housing, means inward of said opening for receiving and guiding said card in a fixed path, means for registering said card within said housing, means guiding said record-keeping paper within said housing in alignment with and adjacent said card when said card is inserted into said housing, presettable character printing means provided adjacent said sheet, a backing member positioned in alignment with said card and said sheet, means comprising a single platen for bringing said card, said printing means and said sheet of paper into contact with each other with sufficient force to print characters of the card and said printing means on the sheet.

4. The device of claim 3 further comprising a stop means for defining the inwardmost position of said card for registering said card within said housing, card sensing means operative upon insertion of said card into said housing for controlling movement of said platen to simultaneously bring said card, said printing means and said paper together, said character printing means being mounted for individual movement from a retracted position in alignment with said platen to positions into engagement with said paper and will thereby form respective impressions thereon, said printing means being individually positionable from the exterior of said housing.

5. The device of claim 3 wherein said single platen is operative to engage and drive said card and said character printing means against said record keeping paper.

6. The device of claim 3 wherein said single platen is operative to engage and drive said paper against said character printing means and said card.

7. The device of claim 3 wherein said printing means is comprised of a plurality of individual printing devices; means for movably mounting said printing devices in said housing from retracted positions to positions aligned with said paper, further means including said platen for simultaneously urging said card and said printing devices against said sheet, switch means operative when said card is inserted into said housing for effecting the movement of said platen to urge the card against the surface of said paper, said character printing means being movable from their retracted positions in alignment with said platen whereby they will be urged when the platen advances against said paper and will form respective impressions thereon, said printing means being individually positionable from retracted positions to projected positions in alignment with said platen from the exterior of said housing.

8. The recording apparatus of claim 7 further comprising shearing means wholly contained within said housing for severing a portion of said record paper from the remainder of said paper upon completion of the transaction.

9. For use with a document producing means having a paper tape means comprising at least two layers of paper and a suitable carbon reproducing means for producing a record on each of said two layers and a card having raised portions identifying said card, the improvement comprising a housing for said document producing means; an opening in said housing for receiving said card; means for positioning said tape adjacent the card inserted into said opening, driving means; switch means controlled by the insertion of said card for energizing said driving means to urge the inserted card against said tape to form impressions on said layers of paper thereof; a plurality of manually settable means including raised portions thereof defining discrete characters, each of said manually settable means being movably mounted to position selected ones of said raised portions out of the path of movement of said driving means and further selected ones of said raised portions in the path of movement of said driving means; said driving means comprising a single platen member operative for simultaneously urging said card and selected of said raised portions of said manually settable means into engagement with said tape wherein said selected raised portions and the raised portions of said card create respective impressions on said tape.

10. The recording apparatus of claim 9 further comprising means for guiding one of said two layers to the exterior of said housing while retaining at least one of said records within said record producing means.

11. For use with a document producing means having a paper tape means comprised of at least two layers and a suitable carbon reproducing means provided between said two layers for printing at least two records of a transaction and wherein said two layers are perforated at spaced intervals along said tape with said perforations being arranged transverse to the direction of movement of said tape, and a card having raised portions identifying said card, the improvement comprising a housing, an opening in said housing, means inward of said opening for receiving and guiding said card in a fixed path, means for registering said card within said housing, means guiding said tape within said housing in alignment with and adjacent said card when said card is inserted into said housing, presettable character printing means provided adjacent said tape, a backing member positioned in alignment with said card and one side of said tape, means including a single platen for simultaneously urging said card and said printing means against said tape with sufficient force to print characters of the card and selected of said printing means on said layers of paper tape.

12. For use with a document producting means having a paper tape means; means for feeding said tape through said document producing means and a card including raised portions for identifying said card, the improvement comprising a housing for removably receiving said card; means for positioning said tape adjacent the card inserted into said opening; driving means, switch means controlled by the insertion of said card for energizing said driving means to urge the inserted card and paper tape together to form an impression on said paper, a plurality of manually settable means each having rotatably mounted wheel means, endless printing means provided about each of said wheel means, each of said endless printing means having a plurality of raised characters arranged at spaced intervals, each of said wheel means being operable for selectively positioning at least one of said raised characters opposite said driving means; said driving means comprising a single platen member for simultaneously bringing said card and said settable means into engagement with said tape wherein the raised portions on said card and on said selected settable means create an impression on said tape.

References Cited by the Examiner

UNITED STATES PATENTS

| | | | |
|---|---|---|---|
| 1,203,717 | 11/1916 | Duncan | 101—57 |
| 1,247,305 | 11/1917 | Marbach | 101—113 |
| 1,254,988 | 1/1918 | Crouse et al. | 101—113 |
| 2,276,111 | 3/1942 | Spears | 101—69 |
| 2,782,714 | 2/1957 | Davidson | 101—228 X |
| 2,792,148 | 5/1957 | Goldenberg | 101—269 X |
| 2,958,269 | 11/1960 | Simjian | 95—1.1 |
| 3,083,641 | 4/1963 | Childs et al. | 101—269 |
| 3,111,887 | 11/1963 | Alexander | 95—1.1 |

ROBERT E. PULFREY, *Primary Examiner.*

WILLIAM B. PENN, *Examiner.*

NATHANIEL A. HUMPHRIES, WILLIAM F. McCARTHY, *Assistant Examiners.*